No. 703,166. Patented June 24, 1902.
D. T. WALLACE.
NUT LOCK.
(Application filed July 20, 1901.)
(No Model.) 2 Sheets—Sheet 1.
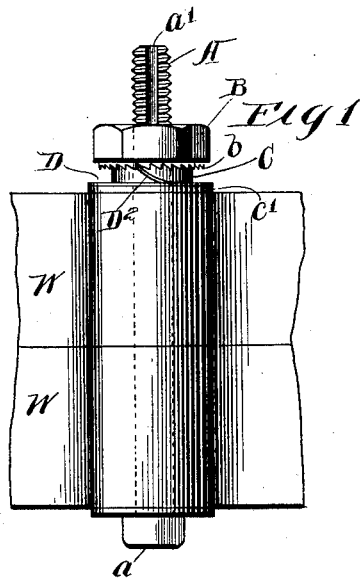
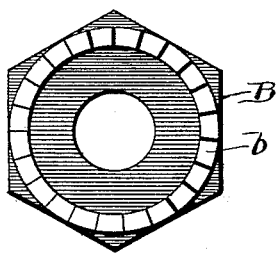
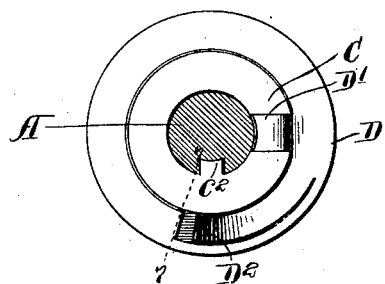
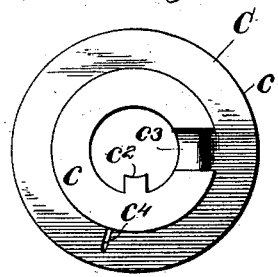
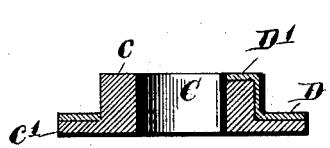
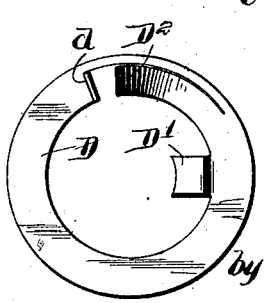
Witnesses:—
Carl H. Crawford
William L. Hall
Inventor:—
David T. Wallace
by Poole & Brown
his Attorneys No. 703,166. Patented June 24, 1902.
D. T. WALLACE.
NUT LOCK.
(Application filed July 20, 1901.)
(No Model.) 2 Sheets—Sheet 2.
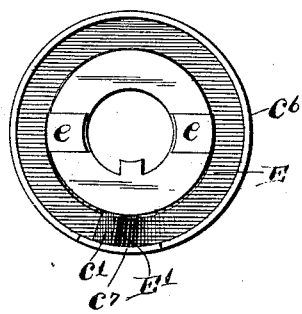
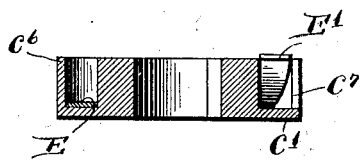
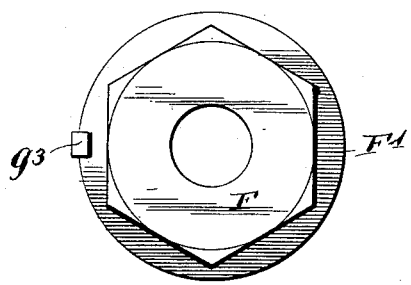
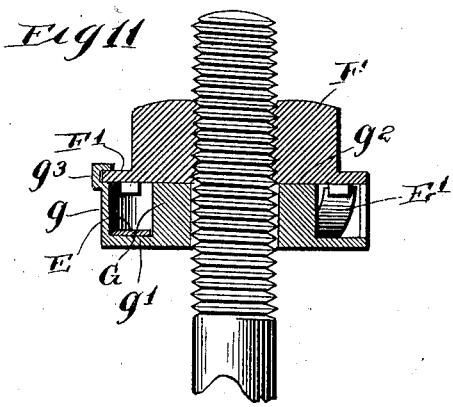
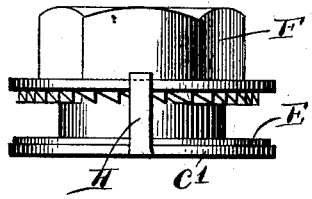
Witnesses:
Carl A. Crawford
William L. Hall
Inventor:
David T. Wallace
by Poole & Brown
his Attorneys

UNITED STATES PATENT OFFICE.

DAVID T. WALLACE, OF CHICAGO, ILLINOIS, ASSIGNOR OF ONE-THIRD TO CHARLES F. THOMPSON, OF CHICAGO, ILLINOIS.

NUT-LOCK.

SPECIFICATION forming part of Letters Patent No. 703,166, dated June 24, 1902.

Application filed July 20, 1901. Serial No. 69,015. (No model.)

*To all whom it may concern:*

Be it known that I, DAVID T. WALLACE, of Chicago, in the county of Cook and State of Illinois, have invented certain new and useful Improvements in Nut-Locks; and I do hereby declare that the following is a full, clear, and exact description thereof, reference being had to the accompanying drawings, and to the letters of reference marked thereon, which form a part of this specification.

This invention relates to improvements in nut-locks of that class wherein the nut is provided on its inner face with a series of projections or ratchet-teeth, which ratchet-teeth are adapted to be engaged by a click formed on or attached to a washer non-rotatively mounted on the bolt inside the nut, said click holding the nut from reversely turning on the bolt.

The invention consists in the matters hereinafter set forth, and more particularly pointed out in the appended claims.

In the drawings, Figure 1 is a side view of two parts joined by a bolt provided with my improved nut-lock. Fig. 2 is an inner face view of the nut removed from the bolt. Fig. 3 is a cross-section of the bolt, showing the washer and locking-ring in position thereon. Fig. 4 is a top plan view of the washer. Fig. 5 is an axial section of the washer and locking-ring. Fig. 6 is a bottom plan view of the locking-ring. Fig. 7 is a fragmentary section on line 7 7 of Fig. 3. Fig. 8 is a top plan view of a washer and locking-ring of a modified construction. Fig. 9 is an axial section of the construction shown in Fig. 8. Fig. 10 is a top plan view of a nut and washer shown in Fig. 11, showing a further modification. Fig. 11 is an axial section of the nut and washer, showing the same in position on a bolt. Fig. 12 is a side elevation of a nut and washer, showing a still further modification.

As shown in said drawings, A designates a bolt, having the usual head $a$; B, a nut which engages the screw-threaded end of the bolt; C, a washer which has sliding non-rotative engagement with the bolt inside of the nut, and D a locking-ring which surrounds said washer and is locked non-rotatively to the washer.

W W designate two pieces of wood or other material adapted to be secured together between the nut and bolt-head.

The nut is provided on its inner face with a circular series of projections $b$, which, as herein shown, have the form of ratchet-teeth, though said form may be varied. Said ratchet-teeth project inwardly from the inner face of the nut. The washer C consists principally of a cylindric body $c$, which is apertured for the passage of the bolt therethrough, and a radial annular flange $c'$, disposed perpendicularly to the axis of the washer. The washer is provided on its inner margin with an inwardly-directed lug $c^2$, which is adapted to enter a longitudinal groove $a'$ on the bolt, whereby said washer is held non-rotative with respect to the bolt. The outer end of said cylindric part of the washer engages the inner face of the nut and is made of a size to fit snugly in the space surrounded by the annular series of teeth or projections $b$ on the nut, the periphery of the outer end of the washer engaging the inner faces of said teeth or projections and preventing lateral movement of said washer relatively to the nut.

The locking-ring D is held non-rotative on the washer, and for this purpose is provided on its inner margin with a right-angle lug D', which engages a notch $c^3$, formed on the end and side faces of the cylindric part of the washer, as clearly shown in Figs. 4 and 5. Said ring is made of spring sheet metal and is provided with an upwardly-directed click $D^2$ at one side thereof, which is adapted for engagement with the teeth $b$ of the nut. Said click is formed by cutting or slitting the ring adjacent to the periphery thereof on a curved line concentric with said periphery, the part of the ring inside of said slit being bent upwardly to form the click. When the locking-ring is placed on the washer and before the nut has been screwed down against the washer, the extremity of the click extends slightly in advance of the end face of the washer, so that when the nut is turned downwardly against the washer the click engages the teeth of the nut before the end faces of the nut and washer are brought into engagement, so that said click when the parts assume their ultimate positions bears with considerable pressure against the projections or teeth of the nut and insures a reliable interlocking engagement therewith. Said nut is rotated when being turned on the bolt in the direction of the inclination of said click of the washer, so that when the nut is turned against the click the click interlocks with the teeth or projections thereof and prevents reverse rotation of the nut in a manner to remove the same so long as said click is engaged therewith. When it is desired to release the nut, the click may be bent inwardly by a suitable instrument, thereby permitting reverse rotation of the nut in a manner to turn the same on the bolt. If desired, the ring may be provided with an additional locking means to prevent the same turning with respect to the washer. As is herein shown, the slit which is cut in the ring to form the click is extended a distance beyond the end of the click, and the part of the ring inside of said extended portion of the slit is turned downwardly at a right angle to the plane of the ring to form a lug $d$, (shown in Figs. 6 and 7,) and said lug engages a notch or recess $c^4$ in the flange of the washer, as shown in Figs. 4 and 7. The lug D' and the additional lug $d$ when the latter is employed prevent the locking-ring from turning with respect to the washer, so that said parts become, in effect, a single non-rotative part.

The use of the separable ring in the construction described is of considerable importance as compared with a construction wherein the locking-click is formed directly on the washer. In the first place this construction permits the locking-ring to be made of reliable spring metal, whereby the resiliency of the click $D^2$ may be relied upon to maintain proper interlocking connection between the washer and the nut. A further advantage of the construction described is that the locking-ring may be very economically made, it being capable of being cut and stamped from sheet metal in large quantities at small expense, and the washer being made plain may be formed by a single forging operation. A further and important advantage of the construction described is that there is no strain brought upon the locking-spring caused by the turning of the nut downwardly on the bolt, said nut engaging the outer face of the washer and said washer taking all of the end thrust of the nut. The only strain, therefore, coming on the locking-ring is that due to the tendency of the nut to turn off the bolt, which obviously is not great.

In Figs. 8 and 9 I have shown a construction differing slightly in its structural detail from that already described. In this modification the flange $c'$ of the washer C is provided with an annular outwardly-directed rim $c^6$, the outer margin of which is flush with the outer end face of the cylindric body portion $c$ of the washer. Between said flange and the body of the washer is formed a groove in which is contained a locking-ring E, which differs from the ring D in that said ring is completely severed or split at one point, and one of the ends thereof is turned upwardly to form a click E'. Said ring is made of such width as to practically fill the groove between the rim $c^6$ and body of the washer. The locking-ring in this instance is provided on its inner margin with two inwardly-extending holding-lugs $e$ $e$, located on opposite sides of the ring and engaging notches or recesses in the body of the washer, as in the construction previously described. The end of the ring remote from the click may be bent, if desired, to form a holding prong or lug like the holding prong or lug $d$ of the ring previously described and adapted to engage a corresponding notch in the flange of the washer. The rim $c^6$ is provided in line with the click with a cut-away portion or opening $c^7$, said opening serving as means for gaining access to the click to release it from the teeth or projections of the washer. The margin of the rim engages the inner face of the nut outside of the annular series of teeth or projections thereon when the nut is turned down upon the washer, and said rim serves to protect the click and prevent the same being accidentally disengaged from the teeth or projections of the nut by articles coming accidentally in contact with said click.

In Figs. 10 and 11 I have shown a further modification, intended to give an additional function to the device. In this construction the nut F, which corresponds with the nut B of the previously-described construction, is provided at its inner end with an annular radial flange F'. The washer G is made like the washer E shown in Figs. 8 and 9, being provided with an annular rim $g$, formed on the outer margin of the radial annular flange $g'$ of said washer, and which rim $g$ extends at its outer edge flush with the outer face of the cylindric body $g^2$ of the washer. The locking-ring in this construction is like that shown in Figs. 8 and 9, and the parts thereof bear like reference-letters. Said rim $g$ in the construction shown in Figs. 10 and 11 is provided at one part thereof with an outwardly-directed hook portion $g^3$, which extends beyond the margin of the rim, and the extremity of which hook portion is bent inwardly toward the body of the washer. The flange F' of the nut F is adapted to fit under said hook, said flange being herein shown as made of such diameter as to bear at its margin against the outer margin of the rim. If desired, however, the flange of the nut may fit inside the rim. In placing the parts on the bolt, the nut is first fitted to the washer, and thereafter the nut and washer are placed on the bolt. The click of the washer E will desirably be located on the side of the washer remote from the hook, so that when the margin of the flange of the nut is engaged with the hook, at which time the nut is inclined to the horizontal, the teeth or projections of the nut are engaged with the free end of the click, which extends somewhat beyond the rim $c^6$.

When, therefore, the nut is brought down flat against the rim, it places the click under compression in such manner as to lock the click in engagement with the teeth. The washer is then fitted on the bolt with the locking-lug $c^2$ engaging the groove $a'$, and the nut is turned downwardly on the screw-threaded end of the bolt. By reason of the engagement of the hook $g^3$ with the flange of the nut the nut and washer are prevented from separating longitudinally of the bolt, while the nut is free to rotate to turn the same downwardly, the click slipping over the projections or teeth of the nut in the rotation of the latter. The interlocking engagement of the washer with the nut prevents the washer from dropping away from the nut, and by reason of the compression put upon the click and the consequent interlocking connection of said click with the teeth or projections of the nut said washer locks the nut from reverse rotation on the bolt, regardless of the position of the washer with respect to the parts W. In other words, by reason of the fact that the nut and washer are interlocked and prevented from separation said washer locks the nut from reverse rotation at any place on the screw-threaded portion of the bolt, whether said washer be in contact with one of the parts W or not. With this construction I am enabled to adjust the nut on the bolt with great precision, because of the fact that the effective interlocking of the click with the teeth or projections of the nut is not dependent upon the engagement of the washer with one of the parts W and the clamping of the washer between the nut and said part. It often occurs that it is desirable to use a nut-lock in places where the adjustment of the nut with respect to the parts through which the bolt passes is required to be precise—such, for instance, as joining the two parts of a bearing in engine-work or other machine-work. Where such precision is required, the distance between the teeth or projections of the nut may be too great to give the desired adjustment, and in such case the final position of the nut may act to clamp the parts more tightly together than they should be clamped, or it may occur that in order to prevent the parts being clamped too tightly together the nut cannot be turned sufficiently tight on said parts to insure a reliable locking of the nut from reverse movement. It may also occur when the nut-lock is used for joining two wooden parts which are liable to shrinkage that in case of shrinkage the distance would become so great between the nut and the adjacent one of said parts to be joined as to permit a movement of the washer sufficient to disengage the click from the teeth or projections of the nut. With my construction, on the other hand, the effective locking of the nut is not dependent upon the engagement of the washer with one of the parts through which the bolt passes, so that, notwithstanding such shrinkage, the reliability of the lock would not be impaired.

Instead of forming the hook on the rim $g$, as shown in Figs. 10 and 11, said hook may be formed on an arm H, rising from the radial flange $c'$, if desired, as shown in Fig. 12.

Other changes may be made in the structural details illustrated without departing from the spirit of the invention, and I do not wish to be limited thereto excepting as hereinafter made the subject of specific claims.

I claim as my invention—

1. The combination with a bolt and a nut, said nut being provided on its inner face with an annular series of teeth or projections which extend beyond the inner face of the nut, of a washer non-rotatively mounted on the bolt, the end face of which engages the inner face of nut within said series of teeth or projections, and a locking-ring removably surrounding the body of the washer and non-rotative thereon, said ring being provided with a click adapted for engagement with said teeth or projections on the nut.

2. The combination with a bolt and a nut, said nut being provided on its inner face with an annular series of teeth or projections, of a washer non-rotatively mounted on the bolt, the outer end of which engages the inner face of the nut within said series of teeth or projections thereof, and a locking-ring surrounding the cylindric body of the washer and provided with a lug which engages a notch in said body and with a click which is adapted for engagement with said teeth or projections on the nut.

3. The combination with a bolt and a nut, said nut being provided on its inner face with an annular series of teeth or projections, of a washer non-rotatively mounted on the bolt, the outer end of which engages the inner face of the nut within said annular series of teeth or projections and provided on its inner end with a radial annular flange, and a locking-ring surrounding the cylindric body of the washer, said ring being provided with a lug which engages a notch in the body of the washer, and with a second lug which engages a notch on the flange of said washer, and being provided also with a click which is adapted to engage the teeth or projections on the nut.

4. The combination with a bolt and a nut, said nut being provided on its inner face with an annular series of teeth or projections, a washer non-rotatively mounted on the bolt, the outer end of which engages the inner end face of said nut within said annular series of teeth or projections and provided on its inner end with a radial annular flange, and a locking-ring surrounding the cylindric body of the washer, said ring being provided on its inner margin with an angular lug which fits within a like-shaped notch formed on the side and end faces of the cylindric body of the washer, and provided also with a click adapted for engagement with the teeth or projections on the nut.

5. The combination with a bolt and nut, said nut being provided on its inner face with an annular series of teeth or projections, of a washer mounted non-rotatively on the bolt inside of said nut, the outer end of which engages the inner face of said nut, and a sheet-metal ring removably and non-rotatively mounted on said washer and provided with a click adapted for engagement with the teeth or projections of the nut.

6. The combination with a bolt and a nut, said nut being provided on its inner face with an annular series of teeth or projections, of a washer non-rotatively mounted on the bolt, said washer being provided in its outer end face with an outwardly-opening groove located in annular alinement with the teeth or projections of the nut, and a non-rotative ring in said groove provided with a click adapted to engage the teeth or projections on the nut, said washer being provided with an opening through which access may be had for releasing said click from said teeth or projections.

7. The combination with a bolt and a nut, said nut being provided on its inner face with an annular series of teeth or projections, of a washer non-rotatively mounted on said nut and provided in its outer end face with an outwardly-opening groove located in annular alinement with said teeth or projections, and a spring-click carried by said washer in said groove adapted for engagement with said teeth or projections, said washer being provided with an opening through which access may be had for releasing the click from the said teeth or projections.

8. The combination with a bolt and a nut, said nut being provided on its inner face with an annular series of teeth or projections, of a washer non-rotatively mounted on the nut and comprising a central body, a radial annular flange on the inner end of said washer, an annular rim on the margin of said flange having its outer margin flush with the end face of said body and adapted to engage the inner face of the nut outside said annular series of teeth or projections, a non-rotative ring located in the groove between said rim and the central body and provided with a click adapted for engagement with the teeth or projections of the nut, said rim being provided inline with said click with an opening.

9. The combination with a bolt and a nut, of a washer non-rotatively mounted on the bolt, interlocking connections between the adjacent faces of said nut and washer which prevent relative rotation thereof in a direction to remove the nut from the bolt, and means preventing separation of said nut and washer longitudinally of the bolt while permitting said nut to turn on the bolt.

10. The combination with a bolt and a nut, said nut being provided on its inner face with an annular series of teeth or projections, of a washer non-rotatively mounted on said bolt and carrying a click adapted for engagement with said teeth, and interlocking connections between the washer and nut preventing movement of the same endwise of the bolt.

11. The combination with a bolt and a nut, said nut being provided on its inner face with an annular series of teeth or projections, of a washer non-rotatively mounted on the bolt and carrying a click adapted for engagement with said teeth or projections, and a hook on the washer adapted to pass over and engage the outer face of the nut to prevent separation of said nut and washer longitudinally of the bolt.

12. The combination with a bolt and a nut, said nut being provided with an annular radial flange and on its inner face with an annular series of teeth or projections, of a washer non-rotatively mounted on the bolt and carrying a click adapted for engagement with said teeth or projections, and a hook on the washer adapted for engagement with the flange on the nut in a manner to prevent separation of said nut and washer longitudinally of the bolt.

13. The combination with a nut and bolt, said nut being provided on its inner face with an annular series of teeth or projections, of a washer non-rotatively mounted on the bolt and provided with a click adapted for engagement with said teeth or projections, said washer being provided with an annular rim adapted for engagement at its outer margin with the inner face of the nut and said rim being provided with a hook which engages the outer face of the nut in a manner to prevent separation of the nut and washer longitudinally of the bolt.

In testimony that I claim the foregoing as my invention I affix my signature, in presence of two witnesses, this 17th day of July, A. D. 1901.

DAVID T. WALLACE.

Witnesses:
 TAYLOR E. BROWN,
 GEORGE R. WILKINS.